Sept. 4, 1962 C. L. D'OOGE 3,052,091
APPARATUS FOR CUTTING OFF THRUST OF A ROCKET MOTOR
Filed Feb. 16, 1959
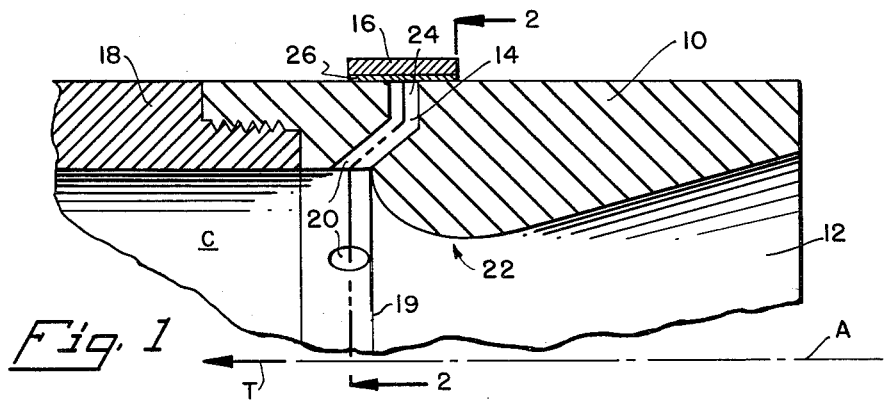
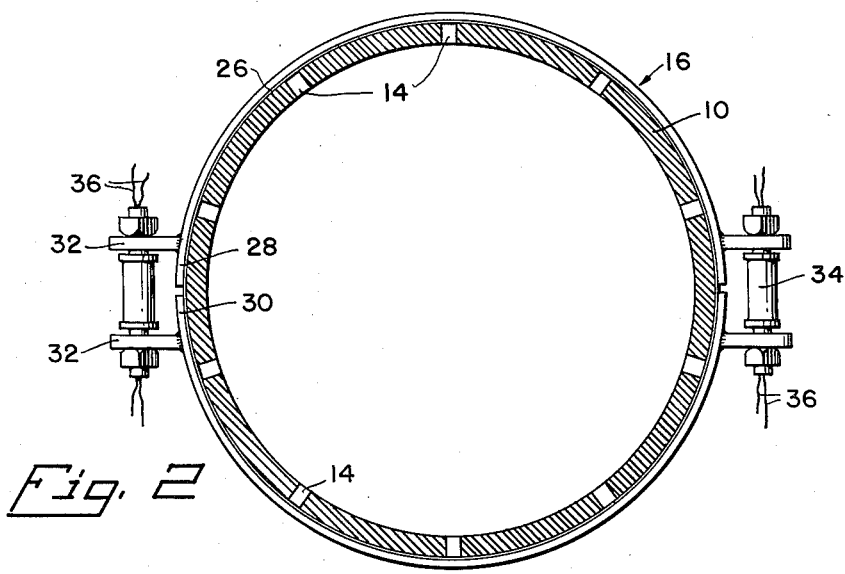
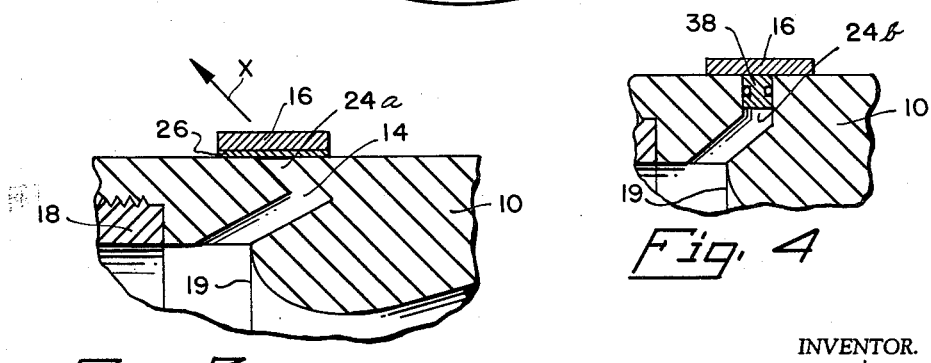
INVENTOR.
CHARLES L. D'OOGE
BY
ATTORNEYS.

3,052,091
APPARATUS FOR CUTTING OFF THRUST OF A ROCKET MOTOR

Charles L. D'Ooge, Citrus Heights, Calif., assignor to United States of America as represented by the Secretary of the Navy
Filed Feb. 16, 1959, Ser. No. 793,648
1 Claim. (Cl. 60—35.6)
(Granted under Title 35, U.S. Code (1952), sec. 266)

The invention described herein may be manufactured and used by or for the Government of the United States of America for governmental purposes without the payment of any royalties thereon or therefor.

This invention relates to rocket motors and more particularly to apparatus for effecting controlled thrust cutoff and/or thrust reversal.

Where rocket motors are used to propel flight vehicles, it is sometimes necessary to effect thrust cut off at a particular time for purposes of velocity or range control. Control of the propellant burning time alone, has not been entirely satisfactory in some instances due to undesired variations inherent in combustion reactions. Examples of prior art methods of thrust cut off include altering the exit nozzle geometry itself, such as by employing jettisonable nozzle plates or jettisonable nozzle inserts. These methods have a disadvantage in that when the nozzle geometry is altered a transient thrust is produced, which may be of sufficient magnitude to cause sensitive guidance systems or airframe structures to fail.

One of the objects of the invention is to provide apparatus for selectively cutting off rocket motor thrust without incurring a thrust peak.

Another object is to provide apparatus for selectively applying a reverse thrust to a rocket motor.

Other objects and many of the attendant advantages of this invention will be readily appreciated as the same becomes better understood by reference to the following detailed description when considered in connection with the accompanying drawings wherein:

FIG. 1 is a partial longitudinal central section of the rear end of a rocket motor showing one form of the invention, FIG. 2 is a section taken along line 2—2, FIG. 1;

FIG. 3 is a section like FIG. 1 of another form of invention; and

FIG. 4 is a section like FIG. 1 of a still further form of invention.

Referring in detail to the drawing, and particularly to FIG. 1, the invention comprises, in general, a nozzle assembly 10, including a single convergent-divergent exit nozzle 12, a plurality of bypass passages 14 extending through the nozzle assembly wall to the ambient medium, and a detachable band 16, which initially overlays and closes the passages 14.

Nozzle assembly 10 is secured to the end of a typical rocket motor tube 18 as part of a thrust generating system, and tube 18 and nozzle assembly 10 together form a cylindrical combustion chamber C. Means for generating gases, such as a rocket propellant grain (not shown), is contained in motor tube 18 and in normal rocket motor operation produces gases which are discharged through exit nozzle 12 along a predetermined nozzle axis A into the surrounding ambient medium, providing thrust along the nozzle axis in a forwardly direction, as shown by arrow T.

The juncture of combustion chamber C and the forward end of the convergent portion of nozzle 12 form a circular juncture 19. Passages 14 extend through the nozzle assembly wall communicating between combustion chamber C and the ambient medium. The inlet end 20 of each passage 14 is disposed upstream relative to the circular juncture 19, providing means to enable motor operating gases to bypass the exit nozzle, and is obliquely inclined relative to the gas stream for more effective diversion of same. In accordance with the basic principles of momentum, the discharge of any gases product from a combustion chamber along a particular direction produces an oppositely directed thrust. Accordingly, in bypassing the exit nozzle, the gases must be discharged in a direction that will not produce a thrust component in the direction of normal operating thrust. The outlet end 24 of each passage 14 is perpendicular to the nozzle axis A, thereby satisfying this requirement since gases discharged therethrough do not produce thrust components in the direction of the normal thrust. Passages 14 are equiangularly spaced about nozzle axis A in a plane normal thereto, as shown in FIG. 2, to prevent undesired asymmetrical thrusts.

Initially, band 16 together with a suitable gasket material 26 is detachably clamped to the exterior of nozzle assembly 10, overlaying and closing passages 14, preventing the discharge of motor operating gases therethrough. As shown in FIG. 2, band 16 comprises two identical segments 28 and 30 having outwardly projecting lugs 32 affixed, as by welding, to each segment near opposite ends thereof, each lug having an aperture extending therethrough to receive a bolt. Segments 28, 30 are clamped together by explosive bolts 34, such as are described in Patent No. 2,809,584, containing an explosive charge, which when detonated electrically through wires 36, effects relative movement between piston and cylinder members therein, forcing segments 28, 30 away from each other and freeing the segments from the nozzle assembly to thereby open passages 14, permitting a portion of the motor operating gases to flow therethrough to depressurize the combustion chamber C, reducing the gas flow through exit nozzle 12 and thereby reducing the nozzle thrust. The extent of thrust reduction depends upon the aggregate area of bypass passages 14, which, if large enough may effect substantially instantaneous depressurization of combustion chamber C to substantially cut off nozzle thrust.

FIG. 3 illustrates an alternative form of the invention, differing from that of FIG. 1 in that each outlet end 24a of passages 14 is inclined in the direction of arrow X, obliquely and forwardly with respect to the nozzle axis A, to provide thrust components in the opposite direction relative to the normal motor operation thrust when gases are discharged therethrough and thereby generate a reverse thrust, which may be desired, for example, to provide a separation force between the payload and rocket motor of a missile. The extent of this reverse thrust depends upon the passage area and the angle of inclination of the outlet end 24a.

FIG. 4 illustrates another alternative form of the invention wherein the passages 14 are sealed by plugs 38, each passage being fitted within an outlet end 24b and having an O-ring sealingly engaging the passage. Band 16 retains the plugs in place until thrust cutoff is desired, whereupon in the same manner as hereinbefore described explosive bolts free the band and the pressure of the motor operating gases expels plugs 38 from the passages, opening same.

While in the interest of simplicity of disclosure nozzle assembly 10 has been illustrated as a single nozzle type, it will be understood that the nozzle assembly may be of the multiple nozzle type. It is to be understood, also, that the "ambient medium" may be the earth's atmosphere or space therebeyond since rocket motors which carry their oxidant may operate in either medium.

Obviously many modifications and variations of the present invention are possible in the light of the above teachings. It is therefore to be understood that within the scope of the appended claim the invention may be practiced otherwise than as specifically described.

What is claimed is:

In a rocket motor of the type having a cylindrical combustion chamber with a solid grain propellant therein and a nozzle communicating one end of said chamber with ambient medium for exhausting gases therefrom along the chamber longitudinal axis for providing normal thrust in the direction of said axis, said combustion chamber having a uniform circular cross section along its length, said nozzle being of the type having convergent and divergent portions, the forward end of said convergent portion forming a circular juncture with the rear end of said cylindrical chamber, the improvements in combination comprising; a plurality of angularly spaced passages of substantially uniform cross section directly communicating said chamber with ambient medium, the aggregate cross sectional area of said passages being sufficient to effect substantially instantaneous depressurization of said combustion chamber, said passages each having an inlet end located at the rear end of said chamber and upstream from said juncture to receive gas at combustion chamber pressure, said passages also arranged to nullify any components of thrust perpendicular to said normal thrust, and means for closing said passages when normal thrust is desired and for selectively opening same when it is desired to terminate normal thrust.

References Cited in the file of this patent
UNITED STATES PATENTS

| | | |
|---|---|---|
| 2,681,548 | Kappus | June 22, 1954 |
| 2,850,976 | Seifert | Sept. 9, 1958 |
| 2,865,169 | Hausmann | Dec. 23, 1958 |